US012241508B2

(12) United States Patent
Brizmer et al.

(10) Patent No.: US 12,241,508 B2
(45) Date of Patent: Mar. 4, 2025

(54) SENSOR BEARING UNIT AND METHOD OF MANUFACTURING SUCH A SENSOR BEARING UNIT

(71) Applicant: Aktiebolaget SKF, Gothenburg (SE)

(72) Inventors: Victor Brizmer, Utrecht (NL); Yuri Kadin, Nieuwegein (NL); Eric Robert, Saint Cyr sur Loire (FR)

(73) Assignee: Aktiebolaget SKF, Gothenburg (SE)

( * ) Notice: Subject to any disclaimer, the term of this patent is extended or adjusted under 35 U.S.C. 154(b) by 106 days.

(21) Appl. No.: 18/124,838

(22) Filed: Mar. 22, 2023

(65) Prior Publication Data

US 2023/0340999 A1  Oct. 26, 2023

(30) Foreign Application Priority Data

Apr. 26, 2022  (DE) .............................. 102022204029

(51) Int. Cl.
| F16C 19/06 | (2006.01) |
| F16C 33/58 | (2006.01) |
| F16C 33/62 | (2006.01) |
| F16C 41/00 | (2006.01) |
| F16C 43/04 | (2006.01) |

(52) U.S. Cl.
CPC ............ *F16C 41/007* (2013.01); *F16C 19/06* (2013.01); *F16C 33/586* (2013.01); *F16C 33/62* (2013.01); *F16C 43/04* (2013.01)

(58) Field of Classification Search
CPC ........ F16C 19/06; F16C 33/586; F16C 33/62; F16C 41/007; F16C 43/04; F16C 2226/80
See application file for complete search history.

(56) References Cited

U.S. PATENT DOCUMENTS

2018/0128320 A1\*  5/2018  Chaussat .................. G01D 5/12

FOREIGN PATENT DOCUMENTS

| FR | 2884367 | B1 | 10/2006 |
| FR | 3052202 | B1 | 12/2017 |

\* cited by examiner

*Primary Examiner* — Phillip A Johnson
(74) *Attorney, Agent, or Firm* — GARCIA-ZAMOR INTELLECTUAL PROPERTY LAW, LLC; Ruy Garcia-Zamor (57) ABSTRACT

A sensor bearing unit comprising:
a bearing comprising first and second rings, each provided with an outer cylindrical surface, an inner cylindrical surface, and lateral surfaces, and
an impulse ring provided with a target holder being axially mounted against one of said lateral surfaces, and comprising a fixing portion secured to the first ring and coming into radial contact with said one of cylindrical surfaces and an abutment portion coming into axial contact with said lateral surface.
Besides, at least one of the lateral and cylindrical surfaces is provided with a textured area comprising a plurality of ribs, and the abutment portion and/or the fixing portion of the target holder is made of a hard material and comprise a soft coating covering the hard material and inside which the ribs are engaged.

20 Claims, 4 Drawing Sheets

FIG.5

# SENSOR BEARING UNIT AND METHOD OF MANUFACTURING SUCH A SENSOR BEARING UNIT

CROSS-REFERENCE TO RELATED APPLICATIONS

This application claims priority to and benefit of the following German patent application: DE 102022204029.5, filed Apr. 26, 2022, which is hereby incorporated by reference in its entirety as if fully set forth herein.

TECHNICAL FIELD

The present invention relates to a sensor bearing unit comprising a bearing and an impulse ring, and a method of manufacturing such a sensor bearing unit.

BACKGROUND

Today, sensor bearing units are commonly used in a wide range of technical fields, for example in automotive industry and aeronautics. These units provide high quality signals and transmissions, while allowing integration in simpler and more compact apparatus.

Such a sensor bearing unit generally comprises a bearing, an impulse ring, and detection means facing the impulse ring. For example, the impulse ring is provided with a target holder and with a magnetized target fixed to the target holder beyond the outer ring of the bearing.

The magnetic target includes alternating North and South poles, whose number depends on bearing size, detection precision and particular application. The detection means may be fixed to the outer ring of the bearing or to a fixed casing.

In a first type of impulse ring, the target holder comprises a flange provided with an outer tubular portion onto which the magnetic target is attached, and with an inner tubular portion secured into an annular groove made in the bore of the inner ring in order to prevent the rotation of the impulse ring relative to the inner ring. For more details, it is possible for example to refer to the patent FR 2 884 367.

In a second type of impulse ring, the target holder of the impulse ring is further provided with a fixing sleeve supporting the flange and secured to the inner ring. The sleeve comprises an annular axial portion secured into the annular groove of the inner ring and a radial collar extending radially outwards the axial portion, the flange being axially mounted between the inner ring of the bearing and the radial collar of the sleeve.

Similarly to the first type of impulse ring, the axial portion of the sleeve is secured into the annular groove of the inner ring in order to prevent the rotation of the impulse ring relative to the inner ring.

It is essential that the impulse ring is fixedly connected in rotation with the bearing inner ring to which it is attached.

In some cases, due to high speeds, thermal dilatation or high mechanical loads, there is a significant risk that the angular mechanical connection between the impulse ring and the inner ring holding it becomes partially or totally loose, permanently or randomly. Should such a failure occur, the signal measured by the detection means would not correspond to the real position or speed or acceleration of the inner ring of the bearing with respect to the outer ring.

Therefore, there is a need to provide a sensor bearing unit with improved angular connection between the impulse ring and the associated bearing inner ring.

More generally, there is also a need to provide a bearing adapted to enhance the angular connection with an additional part intended to be mounted on the inner or outer ring.

SUMMARY OF THE INVENTION

The invention relates to a sensor bearing unit comprising:

a bearing comprising a first ring and a second ring centered on an axis, each of the first and second rings being provided with an outer cylindrical surface, with an inner cylindrical surface, and with lateral surfaces which axially delimit the outer and inner cylindrical surfaces, and an impulse ring provided with a target holder and with a target mounted on the target holder, the target holder being axially mounted against one of said lateral surfaces of the first ring, and comprising a fixing portion secured to the first ring and coming into radial contact with one of said cylindrical surfaces of the first ring and an abutment portion coming into axial contact with said lateral surface of the first ring.

According to a general feature, at least one of the lateral and cylindrical surfaces of the first ring is provided with a textured area comprising a plurality of ribs spaced apart in the circumferential direction and with a plurality of grooves, each groove being located between two successive ribs, and in that the abutment portion and/or the fixing portion of the target holder is made of a hard material and comprise a soft coating covering the hard material and inside which the ribs of the first ring are engaged at least partially.

Preferably, the soft coating has a mean hardness value at least 20% lower than that of the hard material of the abutment portion and/or the fixing portion of the target holder on which the coating is applied.

A "texture area" means a part that has different surface-state features from the rest of the associated cylindrical surface or lateral face.

In a first embodiment, only the inner or outer cylindrical surface of the first ring comprises a textured area comprising the plurality of ribs and grooves. In that case, the fixing portion of the target holder coming into contact with the inner or outer cylindrical surface of the first ring comprises a soft coating inside which the plurality of ribs are engaged at least partially.

In a second alternative embodiment, only one of the lateral surfaces of the first ring comprise a textured area comprising the plurality of ribs and grooves. In that case, only the abutment portion of the target holder coming into contact with said lateral surface of the first ring comprises a soft coating inside which the plurality of ribs are engaged at least partially.

In a third alternative embodiment, one of the inner and outer cylindrical surfaces and one of the lateral surfaces of the first ring are provided with a textured area comprising the plurality of ribs and grooves. In that case, both the abutment portion and the fixing portion of the target holder coming into contact with the inner or outer cylindrical surface and with said lateral surface of the first ring, respectively, comprise a soft coating inside which the plurality of ribs are engaged at least partially.

Alternatively, the abutment portion and/or the fixing portion of the target holder may be provided with the textured area comprising a plurality of ribs spaced apart in the circumferential direction and with a plurality of grooves. In this case, the surfaces of the first ring coming into contact with the abutment portion and/or the fixing portion of the provided with the textured area may comprise a soft coating inside which the ribs of the target holder are engaged at least partially.

With such texture area comprising ribs engaging inside the soft coating, the angular connection with the additional part intended to be mounted on this ring is improved. As a matter of fact, the breaking torque between the additional part and the first ring increases with the ribs and the soft coating.

According to a first embodiment, only the width of the ribs ranges between 60 µm and 150 µm, and preferably between 90 µm and 110 µm.

According to a second embodiment, only the width of the grooves ranges between 60 µm and 150 µm, and preferably between 90 µm and 110 µm.

According to a third embodiment, both of the width of the grooves and the ribs range between 60 µm and 150 µm, and preferably between 90 µm and 110 µm.

Preferably, the width of the ribs is similar to the width of the grooves.

Preferably, the height of the ribs ranges between 10 µm and 50 µm, and preferably between 15 µm and 30 µm.

Preferably, the thickness of the soft coating ranges between 3 µm and 10 µm.

Advantageously, the soft coating is a single layer or a multilayer coating comprising one or more compound selected from: zinc, zinc phosphate, zinc-calcium phosphate, manganese phosphate, black oxide, ZnFe, ZnNi, Sn, Pb, Cu, Ag, Au or their oxides.

The single layer may be a conversion soft coating including zinc, zinc phosphate, zinc-calcium phosphate, manganese phosphate, and black oxide.

Alternatively, the single layer soft coating may be an electrodeposited coating comprising one or more compound selected from Zn, ZnFe, ZnNi or a mixture thereof.

Alternatively, the single layer soft coating may be a pure soft metal coating like Sn, Pb, Cu, Ag, Au, their oxides, or a composite soft coating comprising some or all of them.

According to an embodiment, the soft coating may be a multilayer coating combining the use of one or more of the single layers mentioned above.

In a first embodiment, the target holder of the impulse ring comprises at least a flange onto which is mounted the target, the flange comprising an axial portion forming the fixing portion of the target holder.

The flange of the target holder may further comprise a radial portion forming the abutment portion of the target holder, extending at least radially from the axial portion and coming into axial contact with said lateral surface of the first ring.

In a second embodiment, the target holder of the impulse ring comprises at least a flange onto which is mounted the target and a sleeve, the sleeve comprising an axial portion forming the fixing portion of the target holder, the flange being axially interposed between said lateral surface of the first ring and the sleeve and being radially mounted around said sleeve.

In a third embodiment, the flange of the target holder further comprises a radial portion forming the abutment portion of the target holder, extending radially from the axial portion, the target holder further comprising a washer axially interposed between the radial portion of the flange and said lateral surface of the first ring.

The invention also relates to a method of manufacturing a sensor bearing unit as previously described comprising:
   the formation of the textured area,
   the formation of the soft coating,
   the mounting of the impulse ring on the first ring of the bearing,
   the engagement at least partially of the ribs of the textured area inside the soft coating being achieved during the mounting step of the impulse ring by applying a compressive load on the target holder.

In a first embodiment, the textured area is formed only on the inner or outer cylindrical surface of the first ring. In that case, the soft coating is formed only on the fixing portion of the target holder coming into contact with the inner or outer cylindrical surface of the first ring.

In a second alternative embodiment, the textured area is formed only on one of the lateral surfaces of the first ring. In that case, the soft coating is formed only on the abutment portion of the target holder coming into contact with said lateral surface of the first ring.

In a third alternative embodiment, the textured area is formed on one of the inner and outer cylindrical surfaces and on one of the lateral surfaces of the first ring. In that case, the soft coating is formed on both the abutment portion and the fixing portion of the target holder.

Alternatively, the textured area comprising a plurality of ribs and grooves is formed on the abutment portion and/or the fixing portion of the target holder. In this case, the soft coating is formed on the surfaces of the first ring coming in to contact with the abutment portion and/or the fixing portion of the target holder.

Preferably, the compressive load ranges between 15 kN and 25 kN.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention and its advantages will be better understood by studying the detailed description of specific embodiments given by way of a non-limiting examples and illustrated by the appended drawings on which.

DETAILED DESCRIPTION OF EMBODIMENTS

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the invention. Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C';—and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Figure 1:
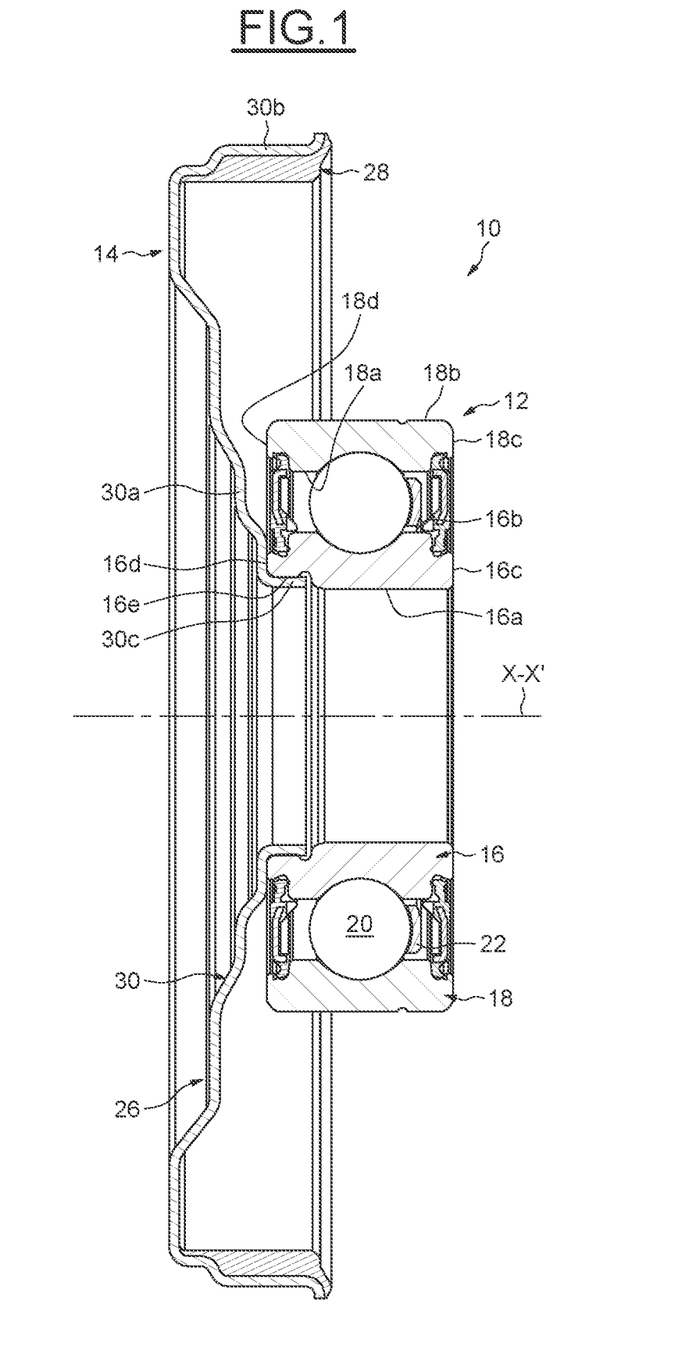
FIG. 1 is an axial section view of a sensor bearing unit according to a first example of the invention.

The sensor bearing unit 10 represented on FIG. 1 is adapted to equip an apparatus such as a motor, a brake system, a suspension system or any rotating machine, in particular for an automotive vehicle, for example a hybrid or electric automotive vehicle.

The sensor bearing unit 10 comprises a bearing 12 and an impulse ring 14 mounted on the bearing. The bearing 12 is intended to be mounted on a shaft (not shown) of the apparatus for tracking the rotation of the shaft.

The bearing 12 comprises a first ring 16 and a second ring 18. In the illustrated example, the first ring 16 is the inner ring whereas the second ring 18 is the outer ring. The inner and outer rings 16, 18 are concentric and extend axially along the bearing rotation axis X-X' which runs in an axial direction. The inner and outer rings 16, 18 are made of steel.

In the illustrated example, the bearing 12 also comprises a row of rolling elements 20, which are provided here in the form of balls, interposed between raceways (not referenced) formed on the inner and outer rings 16, 18. The rolling bearing 10 also comprises a cage 22 for maintaining the regular circumferential spacing of the rolling elements 20.

The inner ring 16 of the bearing is mounted on the outer surface of the shaft of the apparatus. The inner ring 16 is intended to rotate while the outer ring 18 is intended to be fixed. The outer ring 18 can be mounted in a fixed support member or housing, belonging to the apparatus.

The outer ring 18 is provided with a cylindrical inner surface or bore 18a and with an outer cylindrical surface 18b which is radially opposite to the bore 18a. A toroidal circular raceway for the rolling elements 20 is formed from the bore 18a, said raceway being directed radially inwards. The outer ring 18 also is also provided with two opposite radial lateral surfaces 18c, 18d which axially delimit the bore 18a and the outer surface 18b of said ring.

Similarly to the outer ring 18, the inner ring 16 is provided with a cylindrical inner surface or bore 16a and with an outer cylindrical surface 16b which is radially opposite to the bore 16a. A toroidal circular raceway for the rolling elements 20 is formed from the outer cylindrical surface 16b, said raceway being directed radially outwards.

The inner ring 16 is also provided with two opposite radial lateral surfaces 16c, 16d which axially delimit the bore 16a and the outer surface 16b of said ring.

The inner ring 16 further comprises a cylindrical groove 16e made in the bore 16a. The groove 16e is centered on the axis X-X'. Diameter of bore 16a is smaller than diameter of groove 16e. The groove 16e opens on the radial lateral surface 16d.

The impulse ring 14 is mounted on the inner ring 16. The impulse ring 14 comprises an annular target holder 26 and a target 28 mounted on said target holder. In this example illustrated in FIG. 1, the target holder 26 only comprises a flange 30 onto which is mounted the target 28.

The flange 30 is axially secured to the inner ring 16 of the bearing. The flange 30 is mounted into the bore 16a of the inner ring of the bearing. The flange 30 is axially mounted against the lateral surface 16d of the inner ring. In the disclosed example, the flange 30 is made in one part. The flange 30 is made of metal, for example steel.

The flange 30 comprises an annular radial portion 30a, an outer annular axial portion 30b radially surrounding the bearing 12, and an inner axial portion 30c secured to the inner ring 16 and defining the bore of the flange.

The outer axial portion 30b is located radially above the outer ring 18 of the bearing. The outer axial portion 30b extends radially a large-diameter edge of the radial portion 30a.

The radial portion 30a of the flange extends between the outer and inner axial portions 30b, 30c. The axial portion 30c extends axially inwards the radial portion 30a. The axial portion 30c extends axially a small-diameter edge of the radial portion 30a. Here, the inner axial portion 30c extends purely axially.

The radial portion 30a of the flange axially abuts against the radial lateral surface 16d of the inner ring and forms a radial abutment portion. The radial portion 30a substantially extends radially from the axial portion 30c. In the illustrated example, the radial portion 30a of the flange is provided with frustoconical parts inclined with respect to the axis X-X' towards the opposite direction of the bearing 12. Frustoconical parts prevent any interference between the flange 30 and the outer ring 18 of the bearing.

The flange 30 is axially secured to the inner ring 16 by means of the inner axial portion 30c. The inner axial portion 30c forms an axial fixing portion of the target holder. The axial portion 30c is mounted into the bore 16a of the inner ring of the bearing. The axial portion 30c comes into radial contact with the bore 16a.

As will be described later, the radial abutment portion 30a of the target holder 26 comprises a soft coating 70, made of ZnP, covering the hard substrate material and inside which are engaged a plurality of ribs 42 of a textured region or area 40 provided on the inner ring.

The inner portion 30c is secured into the bore 16a. More precisely, the inner portion 30c is mounted and secured into the groove 16e of the bore. For example, the inner portion 30c of the flange may be secured into the bore 16a of the inner ring 16e, by axial press-fitting. Alternatively, the inner axial portion 30c of the target holder may be secured into the bore 16a by snapping, by gluing, by welding, by radial crimping or any other appropriate means.

The target 28 is mounted on the outer axial portion 30b of the flange. In the disclosed example, the target 28 is mounted into the bore of the outer axial portion 30b. Alternatively, the target 28 may be mounted on the outer surface of the outer axial portion 30b.

In one embodiment, the target 28 includes magnetic North and South alternated poles. The target 28 is multi-polarly magnetized in the circumferentially direction. The target 28 may be a plastic molded part. The target 28 may be overmolded onto the flange 30. Alternatively, the target 28 may be separately formed and secured onto the flange 30 by any appropriate means, for example by bonding or by press-fitting. The target 28 may be formed of a rubber material with magnetic powder, or of a magnetic alloy or of a plasto-ferrite or of an elasto-ferrite.

Detection means (not shown) are associated with the target 28 for tracking the rotation of the impulse ring 14 and the inner ring 16 around the axis X-X'. The detection means are disposed to radially face the inner surface of the target 28. For example, the detection means may include Hall-effect sensors. The target 28 is a radial target. Alternatively, the target may be an axial target.

As an alternative, the target 28 and the detection means may use any other suitable technology instead of magnetic technology. For example, induction technology or optic technology may be implemented.

As previously mentioned, the inner ring is provided with the texture area 40 having a plurality of ribs 42. More precisely, the lateral surface 16d of the inner ring is provided with the texture area 40. The texture area is also provided with a plurality of grooves 44.

Figure 2:
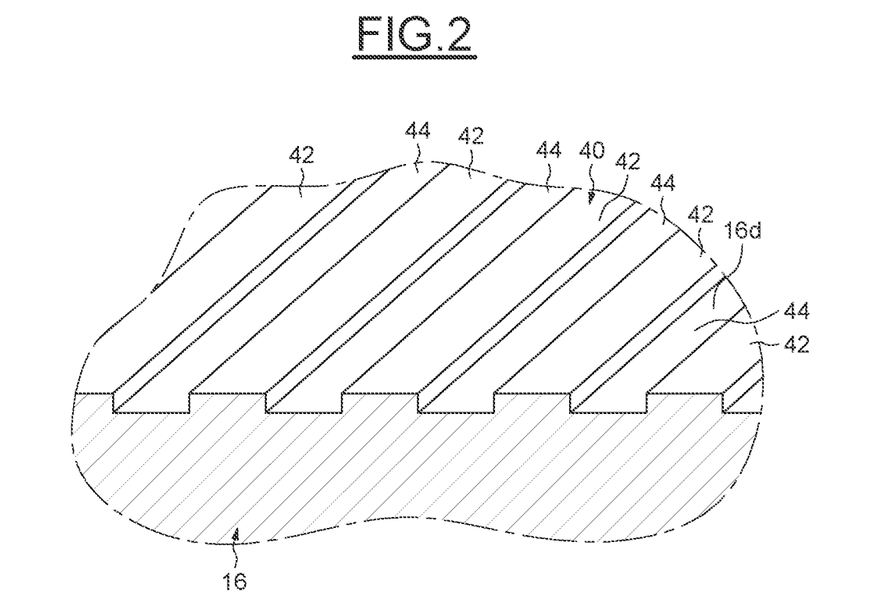
FIG. 2 is a detail view of the bore of the inner ring of the sensor bearing unit illustrated in FIG. 1.

As shown more clearly on FIG. 2, the ribs 42 are spaced apart in the circumferential direction. The ribs 42 are here regularly spaced apart in the circumferential direction. Each groove 44 is located between two successive of ribs 42. Here, the grooves 44 are regularly spaced apart in the circumferential direction.

Preferably, the plurality of ribs 42 and the plurality of grooves 44 extend over the whole circumference of radial lateral surface 16d of the inner ring.

Alternatively, the plurality of ribs 42 and the plurality of grooves 44 may extend over only a portion of the radial lateral surface 16d, or over a plurality of portions of the radial lateral surface 16d.

Preferably, each rib 42 and each groove 44 extend radially on the entire surface of the radial lateral surface 16d.

Alternatively, each rib 42 and each groove 44 may extend partially on the radial lateral surface 16d.

Figure 3:
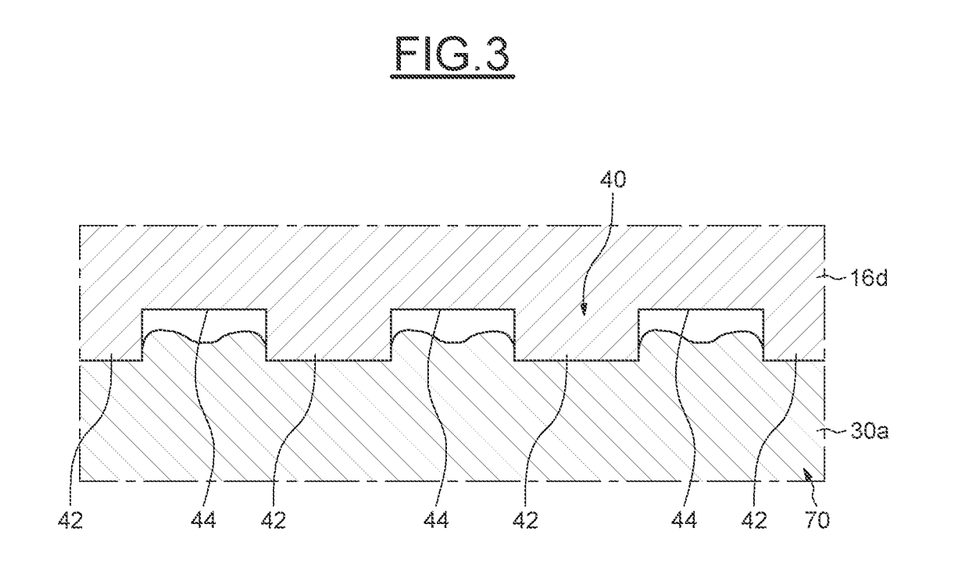
FIG. 3 is a detail view of the interface between the bore of inner ring and the axial portion of the target holder of the sensor bearing unit illustrated in FIG. 1.

As shown in the cross-section view of FIG. 3, the plurality of ribs 42 and the plurality of grooves 44 forms an indentation.

In the illustrated example, all the walls constituting the set of ribs 42 and grooves 44 are arranged in such way as to form an indentation having substantially right angles and a rectangular section.

Preferably, the width of the ribs of the set of grooves and ribs ranges between 60 µm and 150 µm, and more preferably between 90 µm and 110 µm.

Preferably, the width of the grooves 44 of the set of grooves and ribs also ranges between 60 µm and 150 µm, and more preferably between 90 µm and 110 µm.

Advantageously, the width of the ribs 42 may be similar to the width of the grooves.

Preferably, the height of the ribs 42 of the set of grooves and ribs ranges between 10 µm and 50 µm, and more preferably between 15 µm and 30 µm.

In the illustrated example, the ribs 42 and the grooves 44 of the textured area 40 are formed by local deformation of the material of the radial lateral surface 16d of the inner ring caused by impact, preferably by the impact of a laser beam. In this case, the textured area 40 is a laser-generated texture area.

In this example, the radial portion 30a of the flange 30 comprises a single layer ZnP coating 70 having a mean hardness value at least 20% lower than that of the hard substrate material which is steel in this example. The plurality of ribs 42 of the radial lateral surface 16d of the inner ring 16 are engaged, at least partially, inside the ZnP coating 70.

ZnP coating means a zinc phosphide coating.

As shown in FIG. 3, the engagement of the plurality of ribs 42 results in the local deformation of the ZnP coating 70 having a lower hardness than steel.

Preferably, the thickness of the ZnP coating 70 ranges between 3 µm and 10 µm.

The plurality of ribs 42 of the textured area 40 formed on the radial lateral surface 16d of the inner ring comes into contact with the radial portion 30a of the flange 30 of the impulse ring 14.

The engagement of the ribs 42 into the ZnP coating 70 of the target holder 26 increases the friction torque between the inner ring 16 and the impulse ring 14. This abrasive friction mechanism provides high grip capacity without being accompanied by wear. The angular connection between the impulse ring 14 and the inner ring 16 is improved.

In this example, both the width of the grooves 44 and the width of the ribs 42 is 100 µm and the height of the ribs 42 is 22 µm. Besides, the thickness of the ZnP coating 70 is 5 µm.

Alternatively, the soft coating 70 may be a single layer or a multilayer coating comprising one or more compound selected from: zinc, zinc phosphate, zinc-calcium phosphate, manganese phosphate, black oxide, ZnFe, ZnNi, Sn, Pb, Cu, Ag, Au or their oxides.

The invention also concerns a method of manufacturing a sensor bearing unit as previously described.

The method of manufacturing comprises the formation of the textured area 40 and the formation of the ZnP coating 70.

The method of manufacturing also comprises the mounting of the impulse ring 14 on the inner ring 16 of the bearing 12.

The engagement, at least partially, of the ribs 42 of the textured area inside the ZnP coating 70 is achieved during the mounting step of the impulse ring 14 by applying a compressive load on the target holder 26.

Considering the softness of the ZnP coating 70, the ribs 42 engage inside the ZnP coating 70.

In this example, both the flange 30 and the inner ring 16 are made of steel. Preferably, the steel of the flange 30 is softer than the steel of the inner ring 16 in order to facilitate the local deformation of the surface of the ZnP coating 70 during the application of the compressive load.

Alternatively, the textured area 40 comprising the plurality of ribs 42 can be formed on the bore 16a of the inner ring, preferably the grooves 16e of the inner ring 16. In this case, a ZnP coating 70 is formed on the axial portion 30a of the sleeve 60 of the target holder 26 so that the ribs 42 of the bore 16a can engage inside the ZnP coating on the axial portion 30a of the sleeve 60.

Preferably, the compressive load ranges between 15 kN and 25 kN which lead to a deep penetration of the set of ribs and grooves into the ZnP coating 70.

In this example, the compressive load is 21 kN.

After the unloading, the complementary indentation formed in the ZnP coating 70 remains present, leading to a good engagement between the inner ring 16 and the target holder 26.

Advantageously, the textured area 40 comprising the plurality of ribs 42 and grooves 44 may be formed by laser treatment.

The formation of the textured area by laser leads to a more accurate and evenly arranged set of ribs 42 and grooves 44 and, consequently, to a better grip between the inner ring 16 and the impulse ring 14.

In this example, the texture area 40 is provided on the lateral surface 16d of the inner ring 16 coming into contact with the radial portion 30a of the target holder 26. The textured area 40 extends circumferentially on the radial lateral surface 16d of the inner ring.

In another embodiment, the textured area 40 may be provided only on the bore 16a, preferably the groove 16e, coming into contact with axial portion 30c of the flange 30. In that case, the axial portion 30c of the flange 30 coming into contact with the bore 16a of the inner ring 16 may be provided with a ZnP coating 70.

In another embodiment, the textured area 40 may be provided both on the lateral surface 16d and on the bore 16a of the inner ring. In that case, both the radial portion 30a of the flange 30 and the axial portion 30c of the flange 30 may be provided with a ZnP coating 70.

Figure 4:
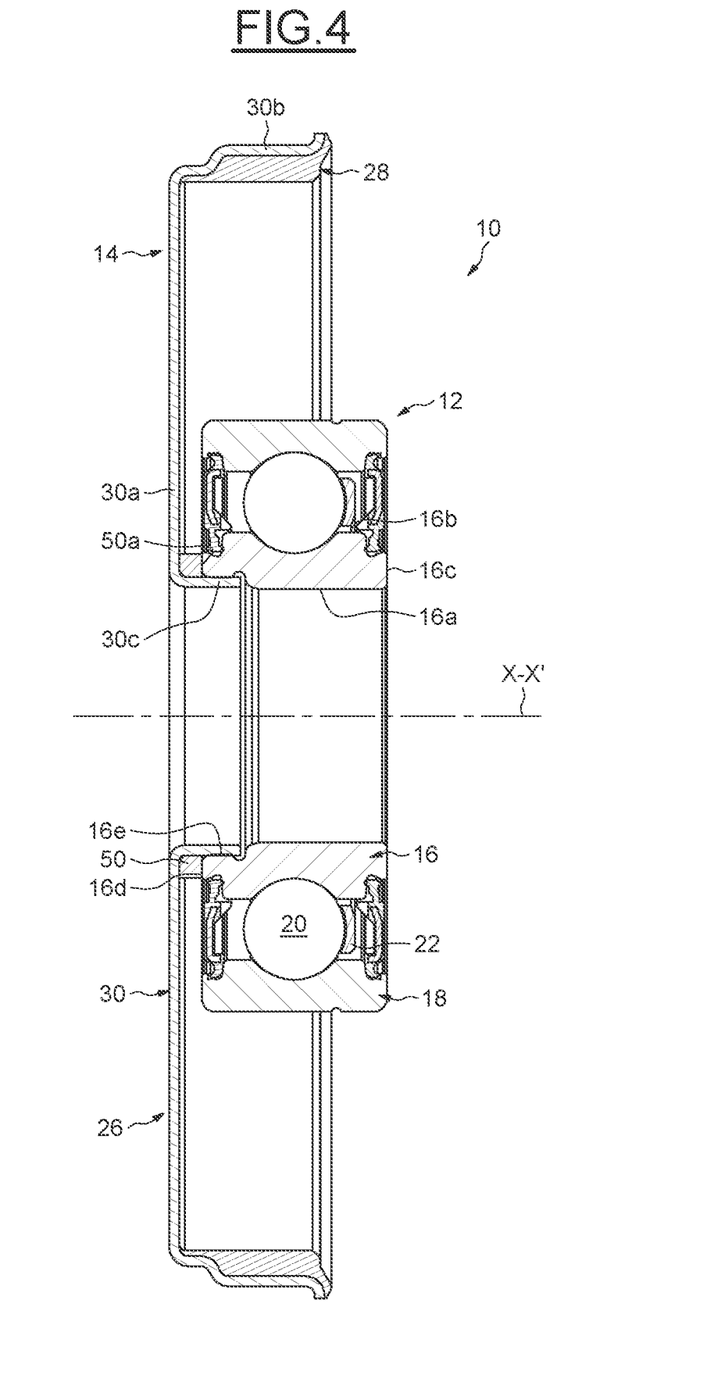
FIG. 4 is an axial section view of a sensor bearing unit according to a second example of the invention.

The second example shown on FIG. 4, in which identical part are given identical references, mainly differs from the first example in that the target holder 26 comprises the flange 30 onto which is mounted the target 28, and a washer 50 axially interposed between the radial portion 30a of the flange and the inner ring 16. The washer 50 is distinct from the flange 30.

The washer 50 is axially interposed between the radial portion 30a of the flange and the lateral surface 16d of the inner ring. The washer 50 is in axial contact against the lateral surface 16d of the inner ring on one side and in axial contact with the radial portion 30a of the flange on the other side.

A lateral surface 50a of the washer 50 comes in contact with the lateral surface 16d of the inner ring 16 so that the washer 50 forms a radial abutment portion of the target holder 26. The washer 50 is mounted radially around the inner axial portion 30c of the flange.

The washer 50 is a spacer for axially shifting the flange 30 relative to the outer ring 16 of the bearing in order to avoid interferences therebetween. Accordingly, with regard to the first example, the radial portion 30a of the flange may have a simplified shape. In the illustrated example, the radial portion 30a of the flange extends purely radially.

Similarly to the first example, the radial lateral surface 16d of the inner ring is provided with a textured area comprising a plurality of ribs and grooves. In that case, the radial lateral surface 16d of the inner ring comes into contact with the washer 50 of the target holder. The lateral surface 50a of the washer 50 coming into contact with the lateral surface 16d of the inner ring 16 is advantageously provided with a ZnP coating 70.

In another embodiment, the textured area 40 may be provided only on the bore 16a, for example the groove 16e, coming into contact with axial portion 30c of the flange 30. In that case, the axial portion 30c of the flange 30 coming into contact with the bore 16a of the inner ring 16 may be provided with a ZnP coating 70.

In another embodiment, the textured area 40 may be provided on both the lateral surface 16d and the bore 16a of the inner ring. In that case, both the lateral surface 50a of the washer 50 and the axial portion 30c of the flange 30 may be provided with a ZnP coating 70.

Figure 5:
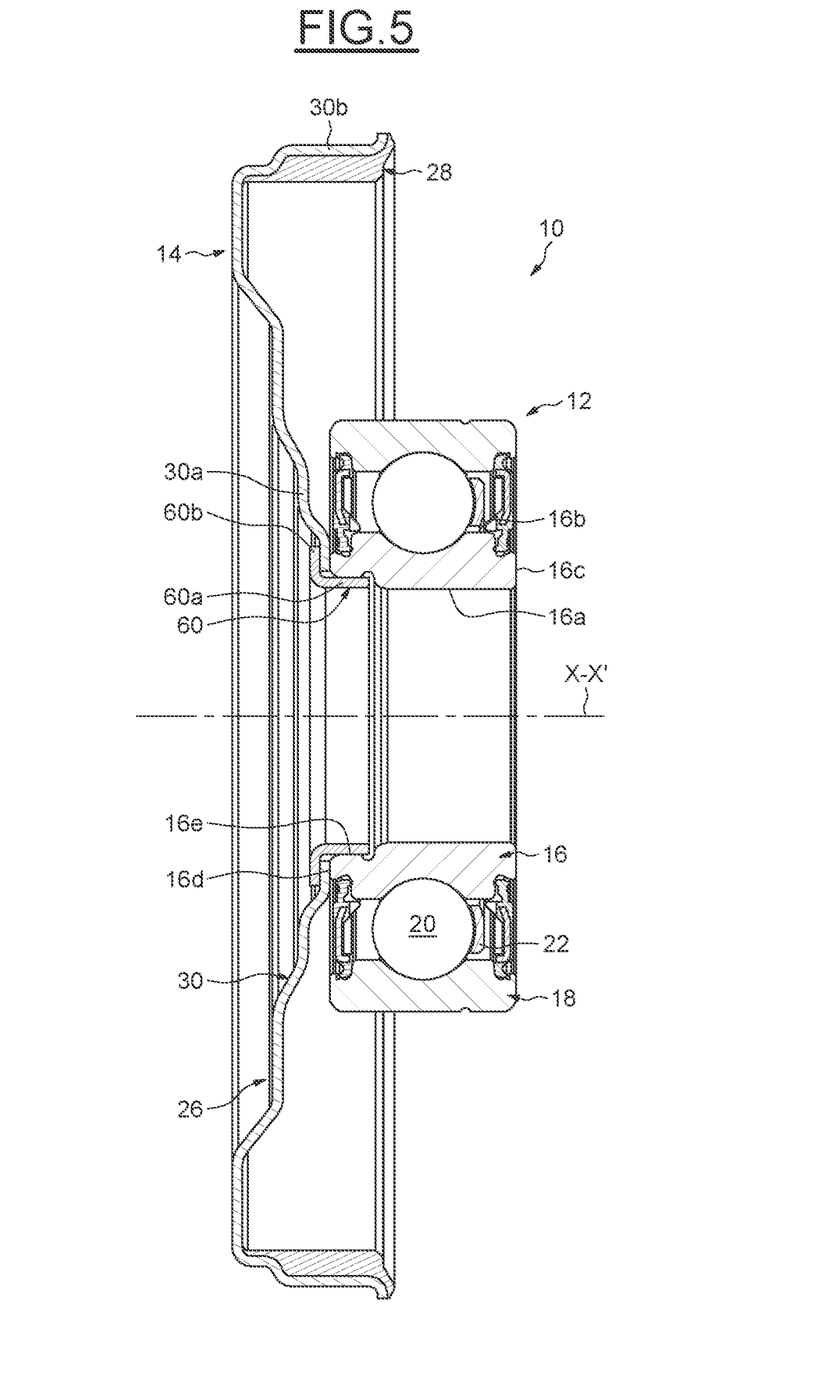
FIG. 5 is an axial section view of a sensor bearing unit according to a third example of the invention.

The third example shown on FIG. 5, in which identical part are given identical references, differs from the first example in that the target holder 26 comprises the flange 30 onto which is mounted the target 28, and a fixing sleeve 60 secured to the inner ring 16. In this example, the sleeve 60 forms a fixing portion of the target holder 26.

The flange 30 is axially secured to the inner ring 16 of the bearing by means of the sleeve 60. In this example, the flange 30 is deprived of the inner axial portion 30c and the axial portion 60a of the sleeve 60 forms the axial fixing portion of the target holder 26. The radial portion 30a defines the bore of the flange 30.

The flange 30 is axially mounted between the lateral surface 16d of the inner ring and the sleeve 60. The flange 30 is mounted radially around the sleeve 60. The radial portion 30a of the flange is axially interposed and clamped between the lateral surface 16d of the inner ring and the sleeve 60. The flange 30 is in axial contact against the lateral surface 16d of the inner ring on one side and in axial contact with the sleeve 60 on the other side. The radial portion 30a forms the radial abutment portion of the target holder 26.

The sleeve 60 is axially secured to the inner ring 16. The sleeve 60 is mounted into the bore 16a of the inner ring of the bearing. The sleeve 60 is secured into the bore 16a. More precisely, the sleeve 60 is mounted and secured into the groove 16e of the bore. For example, the sleeve 60 may be secured into the bore 16a of the inner ring 16e, by axial press-fitting. Alternatively, the sleeve 60 may be secured into the bore 16a by snapping, by gluing, by welding, by radial crimping or any other appropriate means. In the disclosed example, the sleeve 60 is made in one part. The sleeve 60 is be made of metal.

The sleeve 60 comprises an annular axial portion 60a defining the bore of the sleeve, and an outer radial collar or portion 60b extending radially from the axial portion 60a. The radial portion 60b extends radially outwards from the axial portion 60a. The portion 60b extends from an axial end of the axial portion 30a.

The flange 30 is mounted radially around the axial portion 60a of the sleeve. The radial portion 30a of the flange is mounted radially around the axial portion 60a. An annular radial gap (not referenced) subsists between the bore of the flange 30 and the axial portion 60a of the sleeve. The axial portion 60a of the sleeve is secured to the inner ring 16 of the bearing. The axial portion 60a of the sleeve forms a fixing portion of the target holder. The axial portion 60a is mounted and secured into the bore 16a of the inner ring of the bearing. More precisely, the axial portion 60a of the sleeve is mounted and secured into the groove 16e of the bore. The axial portion 60a comes into radial contact with the bore 16a.

The flange 30 is axially interposed and clamped between the lateral surface 16d of the inner ring and the radial portion 60b of the sleeve. The radial portion 60b axially abuts against the radial portion 30a of the flange.

In this third example, similarly to the first example, the textured area 40 is formed only on the radial lateral surface 16d of the inner ring. The textured area comes into contact with the radial portion 30a of the flange 30 provided with a ZnP coating 70.

Alternatively, only the bore 16a of the inner ring 16 coming into contact with the axial portion 60a of the sleeve 60 may comprise a textured area. In this case, the axial portion 60a of the sleeve 60 may comprise a ZnP coating 70.

In another embodiment, the textured area 40 may be provided both on the lateral surface 16d and on the bore 16a. In that case, both the radial portion 30a of the flange 30 and the axial portion 60c of the sleeve 60 may be provided with a ZnP coating 70.

Alternatively, the textured area 40 comprising a plurality of ribs 42 and a plurality of grooves 44 may be formed on the abutment portion and/or the fixing portion of the target holder. In this case, the ZnP coating may be formed on one surface of the inner ring 16 so that the ribs 42 of the target holder 26 engage, at least partially, the ZnP coating.

Otherwise, as previously mentioned, in the illustrated examples, the first ring of the rolling bearing is the inner ring whereas the second ring is the outer ring. As an alternative, it could be possible to provide a reversed arrangement with the first ring forming the outer ring and the second ring forming the inner ring. In this case, the impulse ring 14 is secured to the outer ring 18, and at least one of the outer surface 18b and the lateral surface 18c or 18d of the outer ring is provided with the textured area comprising a plurality of ribs 42 and a plurality of grooves 44.

In the illustrated examples, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

In the previous examples, an impulse ring 14 is secured to the inner or outer ring of the bearing which is provided with the textured area(s) 40. Alternatively, the textured area(s) may be provided on the inner or outer ring in order to improve the angular connection with another part, for example a sensor body, a seal, etc that may comprise a soft coating.

The invention claimed is:

1. A sensor bearing unit comprising:
a bearing comprising a first ring and a second ring centered on an axis, each of the first and second rings being provided with an outer cylindrical surface, with an inner cylindrical surface, and with lateral surfaces which axially delimit the outer and inner cylindrical surfaces, and
an impulse ring provided with a target holder and with a target mounted on the target holder, the target holder being axially mounted against one of said lateral surfaces of the first ring, and comprising a fixing portion secured to the first ring and coming into radial contact with one of the inner and outer cylindrical surfaces of the first ring and an abutment portion coming into axial contact with said lateral surface of the first ring,
characterized in that at least one of the lateral and cylindrical surfaces of the first ring is provided with a textured area comprising a plurality of ribs spaced apart in the circumferential direction and with a plurality of grooves, each groove being located between two successive ribs, and in that the abutment portion and/or the fixing portion of the target holder is made of a hard material and comprise a soft coating covering the hard material and the ribs of the first ring are engaged at least partially inside the soft coating, or vice versa.

2. The sensor bearing unit of claim 1, wherein the soft coating has a mean hardness value at least 20% lower than that of the hard material.

3. The sensor bearing unit of claim 2, wherein the width of the ribs and/or the width of the grooves ranges between 60 µm and 150 µm.

4. The sensor bearing unit of claim 2, wherein the height of the ribs ranges between 10 µm and 50 µm.

5. The sensor bearing unit of claim 2, wherein the soft coating is a single layer or multilayer coating comprising one or more compound selected from the group consisting of: zinc, zinc phosphate, zinc-calcium phosphate, manganese phosphate, black oxide, ZnFe, ZnNi, Sn, Pb, Cu, Ag, Au or their oxides.

6. The sensor bearing unit of claim 2, wherein the target holder of the impulse ring comprises at least a flange onto which is mounted the target, the flange comprising an axial portion forming the fixing portion of the target holder.

7. The sensor bearing unit of claim 1, wherein the width of the ribs and/or the width of the grooves ranges between 60 µm and 150 µm.

8. The sensor bearing unit of claim 7, wherein the height of the ribs ranges between 10 µm and 50 µm.

9. The sensor bearing unit of claim 7, wherein the soft coating is a single layer or multilayer coating comprising one or more compound selected from the group consisting of: zinc, zinc phosphate, zinc-calcium phosphate, manganese phosphate, black oxide, ZnFe, ZnNi, Sn, Pb, Cu, Ag, Au or their oxides.

10. The sensor bearing unit of claim 7, wherein the target holder of the impulse ring comprises at least a flange onto which is mounted the target, the flange comprising an axial portion forming the fixing portion of the target holder.

11. The sensor bearing unit of claim 1, wherein the height of the ribs ranges between 10 µm and 50 µm.

12. The sensor bearing unit of claim 11, wherein the soft coating is a single layer or multilayer coating comprising one or more compound selected from the group consisting of: zinc, zinc phosphate, zinc-calcium phosphate, manganese phosphate, black oxide, ZnFe, ZnNi, Sn, Pb, Cu, Ag, Au or their oxides.

13. The sensor bearing unit of claim 11, wherein the target holder of the impulse ring comprises at least a flange onto which is mounted the target, the flange comprising an axial portion forming the fixing portion of the target holder.

14. The sensor bearing unit of claim 1, wherein the soft coating is a single layer or multilayer coating comprising one or more compounds selected from the group consisting of: zinc, zinc phosphate, zinc-calcium phosphate, manganese phosphate, black oxide, ZnFe, ZnNi, Sn, Pb, Cu, Ag, Au or an oxide thereof.

15. The sensor bearing unit of claim 14, wherein the target holder of the impulse ring comprises at least a flange onto which is mounted the target, the flange comprising an axial portion forming the fixing portion of the target holder.

16. The sensor bearing unit of claim 1, wherein the target holder of the impulse ring comprises at least a flange onto which is mounted the target, the flange comprising an axial portion forming the fixing portion of the target holder.

17. The sensor bearing unit of claim 16, wherein the flange of the target holder further comprises a radial portion forming the abutment portion of the target holder, extending at least radially from the axial portion and coming into axial contact with said lateral surface of the first ring.

18. The sensor bearing unit of claim 1, wherein the target holder of the impulse ring comprises at least a flange onto which is mounted the target and a sleeve the sleeve comprising an axial portion forming the fixing portion of the target holder, the flange being axially interposed between said lateral surface of the first ring and the sleeve and being radially mounted around said sleeve.

19. A method of manufacturing the sensor bearing unit according to claim 1, comprising:
    forming the textured area of the first ring,
    forming the soft coating on the target holder, and
    mounting the impulse ring on the first ring of the bearing, wherein
    the engagement at least partially of the ribs of the textured area inside the soft coating being achieved during the mounting step of the impulse ring by applying a compressive load on the target holder.

20. The method of manufacturing according to claim 19, wherein the compressive load ranges between 15 kN and 25 kN.

* * * * *